United States Patent
Kabannik (10) Patent No.: US 11,035,223 B2
(45) Date of Patent: Jun. 15, 2021

(54) METHOD AND SYSTEM FOR DETECTION OF OBJECTS IN A WELL REFLECTING HYDRAULIC SIGNAL

(71) Applicant: SCHLUMBERGER TECHNOLOGY CORPORATION, Sugar Land, TX (US)

(72) Inventor: Artem Valeryevich Kabannik, Novosibirsk (RU)

(73) Assignee: Schulumberger Technology Corporation, Sugar Land, TX (US)

( * ) Notice: Subject to any disclaimer, the term of this patent is extended or adjusted under 35 U.S.C. 154(b) by 89 days.

(21) Appl. No.: 16/313,925

(22) PCT Filed: Jul. 1, 2016

(86) PCT No.: PCT/RU2016/000407
§ 371 (c)(1),
(2) Date: Dec. 28, 2018

(87) PCT Pub. No.: WO2018/004369
PCT Pub. Date: Jan. 4, 2018

(65) Prior Publication Data
US 2020/0308958 A1    Oct. 1, 2020

(51) Int. Cl.
*E21B 47/095*    (2012.01)
*E21B 47/06*    (2012.01)
(Continued)

(52) U.S. Cl.
CPC ............ *E21B 47/095* (2020.05); *E21B 47/06* (2013.01); *G01V 1/46* (2013.01); *E21B 43/26* (2013.01);
(Continued)

(58) Field of Classification Search
CPC ........ E21B 47/095; E21B 47/06; E21B 43/26; E21B 49/00; G01V 1/46; G01V 2210/1234
See application file for complete search history.

(56) References Cited

U.S. PATENT DOCUMENTS

| 2,751,183 A | 6/1956 | Crookston |
| 3,254,524 A | 6/1966 | Tannenberg |

(Continued)

FOREIGN PATENT DOCUMENTS

| CA | 2037277 C | 5/1995 |
| CN | 102253414 A | 11/2011 |

(Continued)

OTHER PUBLICATIONS

First Office Action Received in Chinese Patent Application No. 2016800882004 dated Apr. 23, 2020, 5 Pages.
(Continued)

*Primary Examiner* — Mohamed Barakat (57) ABSTRACT

The proposed method relates to hydrocarbon production, particularly to the monitoring of well operations by way of data analysis based on the cepstral analysis of the well pressure data recorded at the wellhead. The method assumes the detection of a hydraulic signal-reflecting object in the well, wherein: a fluid-filled well is provided with fluid enabling propagation of a hydraulic signal; a hydraulic signal source is provided, said source being in fluid communication with the well and designed to generate a hydraulic signal; a pressure sensor is provided, said pressure sensor records the hydraulic signal and being in fluid communication with the well and at least one hydraulic signal source. The hydraulic signal is recorded with the pressure sensor during well operations, and a pressure cepstrogram is obtained and an intense signal is found on the pressure cepstrogram. Then the position of object reflecting the
(Continued)

hydraulic signal is detected in the well. A system is proposed for constructing a pressure cepstrogram and detecting a downhole object.

28 Claims, 7 Drawing Sheets

(51) Int. Cl.
 *G01V 1/46* (2006.01)
 *E21B 43/26* (2006.01)
 *E21B 49/00* (2006.01)
(52) U.S. Cl.
 CPC ...... *E21B 49/00* (2013.01); *G01V 2210/1234* (2013.01)

(56) References Cited

U.S. PATENT DOCUMENTS

| | | | |
|---|---|---|---|
| 3,376,949 A | 4/1968 | Baker et al. | |
| 3,387,225 A | 6/1968 | Wainwright | |
| 3,679,021 A | 7/1972 | Goldberg | |
| 3,979,724 A | 9/1976 | Silverman et al. | |
| 4,131,178 A | 12/1978 | Bouyoucos | |
| 4,408,676 A | 10/1983 | McCoy | |
| 4,637,463 A | 1/1987 | McCoy | |
| 4,674,067 A | 6/1987 | Zemanek, Jr. | |
| 4,793,178 A | 12/1988 | Ahem et al. | |
| 4,802,144 A | 1/1989 | Holzhausen et al. | |
| 4,823,326 A | 4/1989 | Ward | |
| 4,858,130 A * | 8/1989 | Widrow | E21B 43/26 702/11 |
| 4,885,727 A | 12/1989 | Auger et al. | |
| 4,932,253 A | 6/1990 | McCoy | |
| 4,934,186 A | 6/1990 | McCoy | |
| 4,993,001 A | 2/1991 | Winbow et al. | |
| 5,031,163 A | 7/1991 | Holzhausen et al. | |
| 5,081,613 A | 1/1992 | Holzhausen et al. | |
| 5,093,811 A | 3/1992 | Mellor et al. | |
| 5,117,399 A | 5/1992 | McCoy et al. | |
| 5,170,378 A * | 12/1992 | Mellor | E21B 43/26 181/105 |
| 5,200,894 A | 4/1993 | McCoy et al. | |
| 5,206,836 A | 4/1993 | Holzhausen et al. | |
| 5,285,388 A | 2/1994 | McCoy et al. | |
| 5,361,837 A | 11/1994 | Winbow | |
| 5,406,482 A | 4/1995 | McCoy et al. | |
| 5,464,058 A | 11/1995 | McCoy et al. | |
| 5,472,049 A | 12/1995 | Chaffee et al. | |
| 5,517,854 A | 5/1996 | Plumb et al. | |
| 6,155,378 A | 12/2000 | Qatu et al. | |
| 6,192,316 B1 | 2/2001 | Hornby | |
| 6,401,814 B1 | 6/2002 | Owens et al. | |
| 6,478,107 B1 | 11/2002 | Birchak et al. | |
| 6,724,687 B1 | 4/2004 | Stephenson et al. | |
| 6,970,398 B2 | 11/2005 | Lavrut et al. | |
| 6,978,211 B2 | 12/2005 | Soliman et al. | |
| 7,050,356 B2 | 5/2006 | Jeffryes | |
| 7,100,688 B2 | 9/2006 | Stephenson et al. | |
| 7,302,849 B2 | 12/2007 | Segal et al. | |
| 7,313,481 B2 | 12/2007 | Moos et al. | |
| 7,345,594 B2 | 3/2008 | Huang et al. | |
| 7,397,388 B2 | 7/2008 | Huang et al. | |
| 7,515,505 B2 | 4/2009 | Krohn et al. | |
| 7,552,761 B2 | 6/2009 | Moriarty | |
| 7,617,873 B2 | 11/2009 | Lovell et al. | |
| 7,819,188 B2 | 10/2010 | Auzerais et al. | |
| 8,047,285 B1 | 11/2011 | Smith | |
| 8,838,427 B2 | 9/2014 | Segal et al. | |
| 9,057,232 B2 | 6/2015 | Cioanta et al. | |
| 9,133,697 B2 | 9/2015 | Cavender et al. | |
| 9,453,404 B2 | 9/2016 | Shampine et al. | |
| 9,810,784 B2 | 11/2017 | Altman et al. | |
| 9,841,523 B2 | 12/2017 | Shampine et al. | |
| 10,047,601 B2 | 8/2018 | Shampine et al. | |
| 2002/0162660 A1 | 11/2002 | Depiak et al. | |
| 2004/0065439 A1 | 4/2004 | Tubel et al. | |
| 2004/0069530 A1 | 4/2004 | Prain et al. | |
| 2004/0206495 A1* | 10/2004 | Lehman | E21B 47/02 166/250.1 |
| 2005/0246131 A1 | 11/2005 | Segal et al. | |
| 2006/0072374 A1 | 4/2006 | Kusko | |
| 2006/0207764 A1 | 9/2006 | Rytlewski | |
| 2006/0293857 A1 | 12/2006 | Moos et al. | |
| 2007/0194947 A1 | 8/2007 | Huang et al. | |
| 2008/0080992 A1 | 4/2008 | Cummins | |
| 2008/0236935 A1 | 10/2008 | Coates et al. | |
| 2008/0239872 A1 | 10/2008 | Miller et al. | |
| 2008/0296025 A1 | 12/2008 | Inderberg et al. | |
| 2009/0006005 A1 | 1/2009 | Segal et al. | |
| 2009/0072180 A1 | 3/2009 | Johnson et al. | |
| 2009/0127024 A1 | 5/2009 | Lynch | |
| 2009/0159272 A1 | 6/2009 | Auzerais et al. | |
| 2009/0238036 A1 | 9/2009 | Robertsson et al. | |
| 2009/0295597 A1 | 12/2009 | Grimseth | |
| 2010/0270031 A1 | 10/2010 | Patel | |
| 2011/0011576 A1 | 1/2011 | Cavender et al. | |
| 2011/0267922 A1 | 11/2011 | Shampine et al. | |
| 2012/0017673 A1 | 1/2012 | Godager | |
| 2012/0018150 A1 | 1/2012 | Shampine et al. | |
| 2012/0092960 A1 | 4/2012 | Gaston et al. | |
| 2012/0327742 A1 | 12/2012 | Kusko et al. | |
| 2013/0043873 A1 | 2/2013 | Brannon et al. | |
| 2013/0154846 A1 | 6/2013 | Mangione et al. | |
| 2013/0167628 A1 | 7/2013 | Hull et al. | |
| 2013/0181843 A1 | 7/2013 | Moghaddamnia et al. | |
| 2013/0264054 A1 | 10/2013 | East et al. | |
| 2014/0056101 A1 | 2/2014 | Vu et al. | |
| 2014/0083689 A1 | 3/2014 | Streich et al. | |
| 2014/0239956 A1 | 8/2014 | Hoversten et al. | |
| 2014/0311752 A1 | 10/2014 | Streich et al. | |
| 2015/0159462 A1 | 6/2015 | Cutler | |
| 2015/0159477 A1 | 6/2015 | Lecerf et al. | |
| 2015/0285946 A1 | 10/2015 | Kamal et al. | |
| 2015/0300115 A1 | 10/2015 | Murphree et al. | |
| 2015/0300131 A1 | 10/2015 | Vigderman et al. | |
| 2015/0300327 A1 | 10/2015 | Sweatman et al. | |
| 2016/0102545 A1* | 4/2016 | Coulston | G01L 19/00 340/854.5 |
| 2016/0146962 A1 | 5/2016 | Hayward | |
| 2016/0258281 A1 | 9/2016 | Mandal | |
| 2017/0122088 A1 | 5/2017 | Dumoit | |
| 2017/0138169 A1 | 5/2017 | Bogdan et al. | |
| 2017/0138176 A1 | 5/2017 | Shampine et al. | |
| 2017/0138182 A1 | 5/2017 | Bogdan et al. | |
| 2019/0301273 A1* | 10/2019 | Gillan | E21B 3/02 |

FOREIGN PATENT DOCUMENTS

| | | |
|---|---|---|
| EP | 390526 A2 | 10/1990 |
| JP | H0419313 A | 1/1992 |
| WO | 2004074869 A2 | 9/2004 |
| WO | 2008130978 A1 | 10/2008 |
| WO | 2009086279 A2 | 7/2009 |
| WO | 2014100274 A1 | 6/2014 |
| WO | 2015099663 A1 | 7/2015 |
| WO | 2016014476 A1 | 1/2016 |
| WO | 2018004369 A1 | 1/2018 |

OTHER PUBLICATIONS

Autocorrelation, Wikipedia, 2017, downloaded Apr. 30, 2017 from https://en.wikipedia.org/wiki/Autocorrelation, 10 pages.
International Search Report and Written Opinion issued in International Patent Appl. No. PCT/US2016/061217 dated Mar. 6, 2017; 21 pages.
Laake e al., "A Generator for High Pressure Pulses in Liquids", Journal of Sound and Vibration, vol. 131, No. 2, 1989, pp. 295-304.
Echometer Company, "Gun-Microphone Assemblies for use with acoustic Liquid Level Instruments", 1995, 4 pages.
Raymond, "Hollow Glass Spheres under Pressure in the Ocean—Experiments Show Interesting Properties", IEEE Conf on Eng in the (56) References Cited

OTHER PUBLICATIONS

Ocean Environ and Mar Technol Soc, 11th Annu Meet, Proc; San Diego, CA, USA, Sep. 22-25, 1975, pp. 537-544.
Sercel, "Marine Sources, Ahead of the Curve", Brochure, Jan. 2011, pp. 2-29, France.
International Search Report and Written Opinion issued in PCT/US2016/066431 dated Apr. 3, 2017; 11 pages.
International Search Report and Written Opinion issued in International Patent Appl. No. PCT/US2016/060879 dated Mar. 17, 2017; 10 pages.
International search Report and Written Opinion issued in International Patent Applicaton No. PCT/US2016/061210 dated Feb. 21, 2017; 15 pages.
International search Report and Written Opinion issued in International Patent Application No. PCT/IB2011/050393 dated Oct. 6, 2011.
International Search Report and Written Opinion issued in International Patent Appl. No. PCT/US2016/061209 dated Feb. 16, 2017; 17 pages.
Holzhausen G.R. and Gooch R.P. Impedance of Hydraulic Fractures: Its Measurement and Use for Estimating Fracture Closure Pressure and Dimensions SPE-13892-MS, 1985, pp. 411-422.
Yilmaz O. and Doherty S.M. Seismic Data Analysis: Processing, Inversion and Interpretation of Seismic Data, 2000, p. 167-170.
Bogert B. P., Healy M. G. and Tukey J. W. The Quefrency Alanysis of Time Series for Echoes: Cepstrum, Pseudo Autocovariance, Cross-Cepstrum and Saphe Cracking, in Symposium on Time Series Analysis, New-York, 1963, p. 209-243.
Oppenheim A. V. and Schafer R. W., Digital Signal Processing, Prentice Hall, 1975, p. 530.
Tribolet Jose M. and Oppenheim Alan V. Deconvolution of Seismic Data Using Homomorphic Filtering, Joint Auto. Control Conf., San Francisco, 1977, pp. 68-74.
Stoffa P.L., Buhl P. and Bryan P.L. The application of homomorphic deconvolution to shallow-water marine seismology,—Part I: Models, Geophysics,1974, p. 401-416.
Kanasewich E. R., Time Sequence Analysis in Geophysics, Third Edition, University of Alberta Press, 1974, pp. 355-360.
International Preliminary Report on Patentability issued in International Patent Appl. No. PCT/RU2016/000407 dated Jan. 10, 2019; 7 pages.

\* cited by examiner

METHOD AND SYSTEM FOR DETECTION OF OBJECTS IN A WELL REFLECTING HYDRAULIC SIGNAL

FIELD OF THE DISCLOSURE

The present disclosure relates to hydrocarbon production, particularly to the automatic monitoring of well operations, such as, for example, hydraulic fracturing, both in real time and post-job data analysis based on the cepstrum analysis of well pressure data recorded at the wellhead.

Pressure oscillations observed at the wellhead during hydraulic fracturing and caused by fluid flow changes (water hammers), perforation shots, operation of hydraulic pumps, and other sources are well known in the oil and gas industry. Tube waves generated by these technological events in the well propagate along the wellbore at a certain velocity and reflect from the boundaries of hydraulic impedance changes inside the well. The following can serve as examples of such boundaries (impedance change for a tube wave): wellhead, hydraulic fracture, internal diameter change in the well (casing pipe diameter change). Hydraulic impedance is the ratio of oscillating pressure to oscillating fluid flow (Holzhausen & Gooch, 1985).

Excited and reflected pressure pulses can be identified on a record obtained with a pressure sensor and then processed by determination of period, amplitude, and polarity of the oscillations; when the propagation velocity of tube waves in the well is known, the depths of reflectors and corresponding hydraulic impedances can be determined. The foundations of the method for determining the depth and geometry of a hydraulic fracture by analyzing its hydraulic impedance are laid down in some papers (Holzhausen & Gooch, 1985) or are described in U.S. Pat. No. 4,802,144. The details of the method and the accepted terminology for cepstral analysis are listed in the prior art section.

The results of the analysis of pressure oscillations in the well may be used in hydraulic fracturing both in real time and in post job analysis for: assessing the efficiency of the fracturing fluid flow diverter at the fracture inlet; assessing the fracture geometry (width and length); identifying the event of emergency shutdown of hydraulic fracturing due to proppant settling in the wellbore (screen out); leakage diagnostics in the casing (casing defect); undesirable hydraulic fracturing diagnostics; monitoring of the top point of receiving the fracturing fluid to determine the fluid volume needed to displace the proppant from the wellbore to the fracture.

To use such an analysis, a person skilled in the art looks up the pressure sensor recordings to find and distinguish pressure oscillation events associated with those events, then determines the excited and reflected pulses, and manually measures the oscillation periods and amplitudes. Then, if the propagation velocity of tube waves in the well is known, the depths of reflectors are determined.

However, manual processing of pressure readings is readily applicable to such events as water hammers where excited and reflected signals are sharp pressure pulses with well-defined peaks, but is not suitable for cases where excited and reflected signals are complex waves, for example, generated by oscillations of hydraulic pump strokes. Another drawback of manual data processing is its low efficiency, which limits its use in real time, but also after the work is performed, when large amounts of data are quickly processed (especially if the useful signal is burdened with noise from operating devices).

Therefore, the present disclosure presents a method which could automatically identify and process pressure oscillation events in the well with determination of the actual position (depth) of tube wave reflectors.

A low-cost method for the monitoring of such well operations as hydraulic fracturing is disclosed in accordance with this solution. The monitoring is performed both in real time and post-job data analysis. The method is based on the cepstrum analysis of the recorded well pressure.

The claimed method for detecting well objects and determining their position (or events by their location) is based on the construction of a pressure cepstrogram, which is a visual representation of the cepstrum change with time. Pressure oscillations are detected and traced on the cepstrogram with the algorithm followed by determination of their periods and polarities, which in turn are used to determine the depths and types of respective well reflectors (for example, well completion elements).

BACKGROUND

The prior art solution U.S. Pat. No. 7,100,688, "Fracture monitoring using pressure-frequency analysis", suggests using the changes occurring in the wellbore during a hydraulic fracturing process, which can create or reflect pressure signals. The capturing and processing of such pressure waves during hydraulic fracturing enable persons skilled in the art to monitor the processes in the well in real time or after the work is performed. The extension of a hydraulic fracture results in a burst of acoustic noise, which, along with noise from other sources, turns into a pressure wave (or signal). This acoustic noise can be monitored by transforming pressure signals from time domain into frequency domain. In this disclosure, a waterfall plot of frequency spectra at successive time slices of the original signal is used to determine frequency ridges, such as a ridge of decreasing frequencies indicating fracture extension, and a ridge of increasing frequencies (indicating either fracture closure or proppant filling up the fracture). This solution is based on the continuous monitoring of the signal spectrum.

The prior art solution U.S. Pat. No. 8,838,427, "Method for determining the closure pressure of a hydraulic fracture", proposes a method relating to the field of hydraulic fracturing of subterranean formations. In accordance with this method, a mathematical simulation model of pressure pulse propagation inside a wellbore and inside a fracture is created. Pressure pulses are sent to the wellbore, and the response of the fracture to the pressure pulses is registered. Then, a bottom-hole pressure corresponding to each pulse is determined. The average fracture width is derived by using the mathematical simulation model of pressure pulse propagation inside the wellbore and inside the fracture. A ratio between the simulated average fracture width and the determined bottom-hole pressure is determined. This ratio is extrapolated to a zero-width point, while the fracture closure pressure is determined as a bottom-hole pressure corresponding to the zero width.

However, in this disclosure oscillations are excited artificially (pressure pulse generator) rather than using natural oscillations from the operating equipment. The detections of oscillations is not disclosed.

The prior art solution U.S. Pat. No. 7,313,481, "Methods and devices for analyzing and controlling the propagation of waves in a borehole generated by water hammer", proposes a method for simulating water-hammer waves in a wellbore, which is used to estimate formation parameters such as porosity and permeability, and to design well completion elements. The simulation method uses a model that has a plurality of layers, and at least one of the layers includes radial layering. The formation data determined from the water hammer analysis are used in well development operations.

However, in this disclosure oscillations are excited artificially (the stop/start of a pump causes an event known as a water hammer) rather than using natural oscillations. The detection of oscillations is not claimed.

The prior art solution U.S. Pat. No. 5,170,378A, "Hydraulic impedance test method", proposes a method for determining the height and length of a fracture in a well. It involves the generation of pressure waves in the well. A pressure pulse propagates along the wellbore, and the reflections of the pressure pulse from both the mouth and tip of the fracture are registered. The reflections are represented as pressure fluctuations against time. A theoretical model of the wellbore-fracture system is created, wherein hydraulic impedance is a parameter. Adjusting the parameter of impedance in said model provides the distance from the mouth to the tip of the fracture. The method is dependent on the quality of the designed one-dimensional model of impedance.

SUMMARY

In accordance with the present disclosure, a method is proposed for detecting a hydraulic signal-reflecting object in a well, wherein: providing a well filled with a fluid enabling propagation of a hydraulic signal; providing at least one source of hydraulic signal being in communication with the fluid in the well and designed to generate a hydraulic signal; providing at least one pressure sensor for registration of a hydraulic signal and being in fluid communication with the well and at least one hydraulic signal source. The hydraulic signal is recorded recording the hydraulic signal with at least one pressure sensor during well operations, and an intense signal is then found on the pressure cepstrogram. Then at least one object in the well reflecting the hydraulic signal is detected based on the peaks of intense signal found on the pressure cepstrogram.

Also, in accordance with an embodiment, the hydraulic signal propagation velocity in the fluid in the wellbore is determined by measuring the travel time of the reflected signal from at least one specified object located at a known depth, or depending on the fluid properties, such as density, modulus of elasticity, as well as on the well properties, such as Young's modulus, casing wall thickness, and on the properties of the surrounding rock, for example, shear modulus. Then the depth of the hydraulic signal-reflecting object in the well is determined based on the peaks of the intense signal values on the pressure cepstrogram, which peaks specify the contours of the travel times of the reflected hydraulic signal. Then the type of the hydraulic signal-reflecting object is identified by the sign of the intense signal, which is one of the positive or negative signs.

A system designed for the implementation of the above embodiments of the method for detecting a hydraulic signal-reflecting object in the well is also proposed.

BRIEF DESCRIPTION OF DRAWINGS

Hereinafter, the embodiments of this disclosure are described in more detail by means of drawings, wherein.

DETAILED DESCRIPTION OF EMBODIMENTS

In accordance with the present disclosure, a low-cost method is provided for the monitoring of well operations, such as hydraulic fracturing, both in real time and post job data analysis, based on the cepstral analysis of well pressure data recorded at the wellhead. In particular, the method will enable the detection of a hydraulic signal-reflecting object present in the well, the determination of the depth at which the hydraulic signal-reflecting object is located, as well as the determination of the type of the hydraulic signal-reflecting object.

In accordance with the claimed method for the automatic monitoring of well operations, a well, in which an operation is performed, a source of tube waves, an original excitation signal, and a sensor for registering pressure oscillations containing the source and reflected signals are all provided; then the received hydraulic signal is processed and a pressure cepstrogram is formed, which is used to determine the presence of a hydraulic signal-reflecting object in the well, and the depth and the type of this object.

The source signal can be generated both by natural sources of pressure pulses created during hydraulic fracturing, such as water hammers caused by changes in the fracturing fluid flow; actuations of perforation guns; oscillations of hydraulic pump strokes, etc.; and using sources of pressure pules created artificially, for example, by bleeding or injecting the fluid in the well in a pulsed manner.

Figure 1:
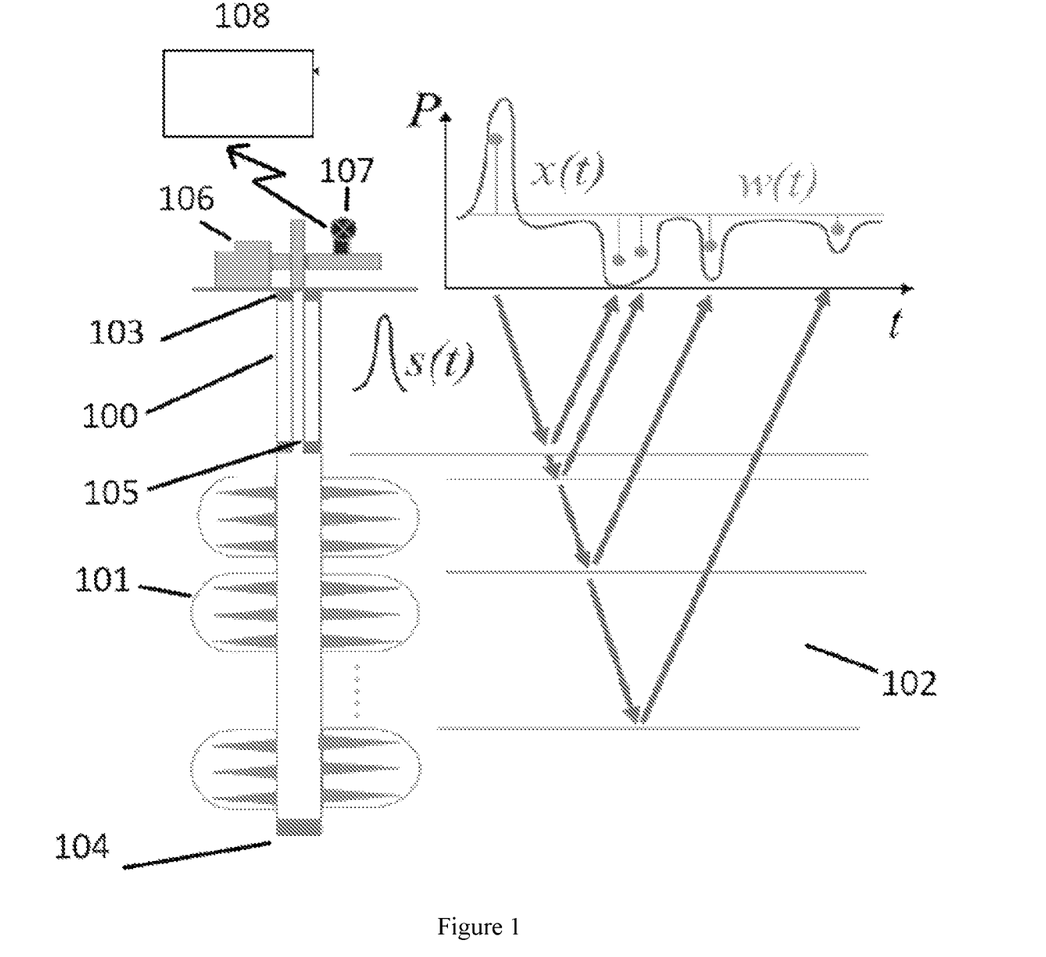
FIG. 1 shows the reflections of the original signal in the well and a convolutional model.

In FIG. 1, a well 100 intersects one or several fractures 101 in a reservoir 102, and has a wellhead 103, a well bottom 104, well completion elements 105 with different internal diameters, or other hydraulic signal-reflecting objects, which have different hydraulic impedances, i.e., the ratios of oscillating pressure to oscillating fluid flow.

The source pressure signal generated by the hydraulic signal source 106 in the above manner propagates along the wellbore at a velocity of about 1,500 m/s and can be registered by a pressure sensor 107 installed at the wellhead and being in hydraulic communication with the wellbore interior, along with the signal reflected from the boundaries of hydraulic impedance variation (reflected signal). It is the reflected signal that contains useful information about the position of the reflector.

The pressure data from the pressure sensor are transferred to a data collection and processing system 108, which visualizes and stores the results.

Figure 2:
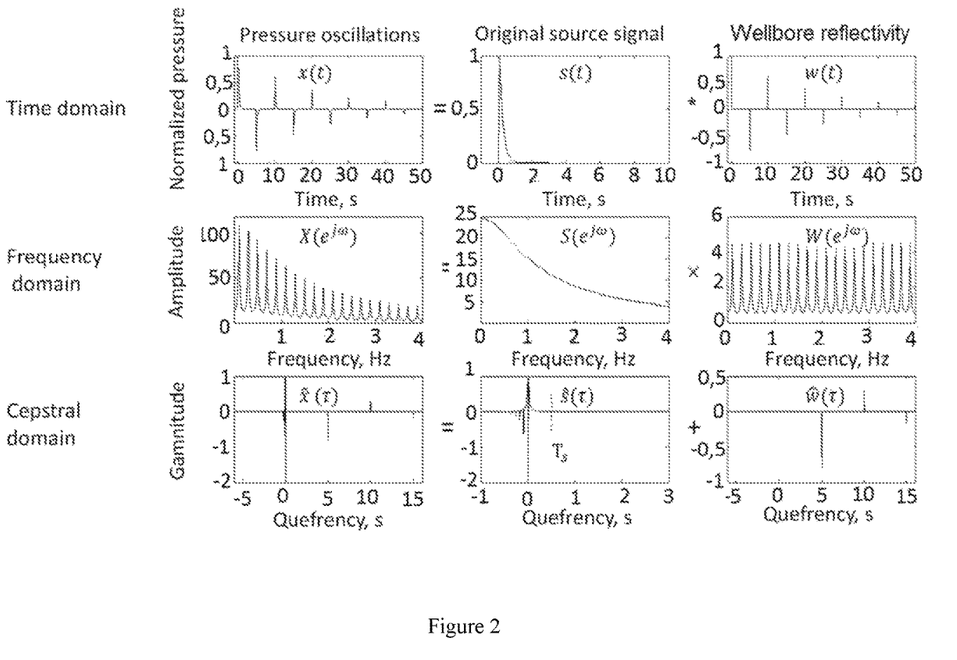
FIG. 2 shows an example of a convolutional equation for a pulse source with a smooth spectrum and the wellbore reflectivity with one fracture in the time, frequency and cepstral domains.

Similarly to the convolutional model of the registered seismic trace (known from seismic survey operations (Yilmaz & Doherty, 2000)), a convolutional model of the registered record of pressure oscillations in the well x(t) is introduced, which can be represented as a mathematical operation of convolution of the source signal s(t) with the wellbore reflectivity w(t), as shown in FIG. 2.

$$x(t)=s(t)*w(t) \quad (1)$$

The wellbore reflectivity w(t) is an unknown parameter in the convolutional equation (1). Normally, it is a minimum-phase decaying train of pulses, the position of which corresponds to the arrival times of the waves reflected from the boundaries of impedance variation inside the well, and the amplitudes are determined by the attenuation of waves in the well and reflection coefficients from the respective reflectors. When the signal propagation velocity and attenuation along the wellbore (they depend on the mechanical properties of the fluid and wellbore walls) are known, and when the convolutional equation (1) with respect to the unknown wellbore reflectivity w(t) is solved, the depths and the types of the reflectors can be determined. In seismic surveys, convolutional equations are solved by using deconvolution in the time or frequency domains, using the knowledge of the signal of the source s(t), the separation of which from the record of pressure oscillations in the well is a time-consuming or impracticable procedure.

In accordance with the present disclosure, it is proposed that cepstral analysis be applied to the convolutional equation (1), which allows the determination of the wave arrival times and the signs of amplitude coefficients in the wellbore reflectivity w(t) without determining the unknown signal of the source s(t).

Theoretical basis of cepstral analysis.

A cepstrum is a nonlinear algorithm for digital data processing, which is sensitive to reflections in the signal and has a wide scope of application: from detection of explosions and earthquakes in seismology to speech recognition and synthesis in sound processing. The concept of cepstrum was first introduced in the (Bogert, Healy, & Tukey, 1963) paper. A complex cepstrum is applying the inverse Fourier transform to the logarithm of the forward Fourier transform of the original signal (Oppenheim & Schafer, 1975).

$$\hat{x}(\tau) = \frac{1}{2\pi} \int_{-\pi}^{\pi} \log[X(e^{j\omega})]e^{j\omega\tau}d\omega \quad (2)$$

The name "cepstrum" is an anagram of the word "spectrum". The independent variable is a measure of time and is called "quefrency" on the analogy of the spectrum frequency, and the cepstrum magnitude is called "gamnitude" (Bogert, Healy, & Tukey, 1963).

Let us represent the equation (1) in the frequency domain. According to the convolution theorem, it will be rearranged as a product:

$$X(e^{j\omega})=S(e^{j\omega}) \cdot W(e^{j\omega}) \quad (3)$$

Here $X(e^{j\omega})$, $S(e^{j\omega})$ and $W(e^{j\omega})$ are the Fourier transforms of the record of pressure oscillations in the well x(t), the original signal of the source s(t), and the wellbore reflectivity w(t), respectively.

Substituting the product from the equation (3) in the expression for the complex cepstrum (2) and using the fact that the logarithm of a product is the sum of the logarithms, we will obtain the representation of the convolutional equation in the cepstral domain:

$$\hat{x}(\tau) = \frac{1}{2\pi} \int_{-\pi}^{\pi} (\log[S(e^{j\omega})] + \log[W(e^{j\omega})])e^{j\omega\tau}d\omega = \quad (4)$$

$$\frac{1}{2\pi}\int_{-\pi}^{\pi}\log[S(e^{j\omega})]e^{j\omega\tau}d\omega + \frac{1}{2\pi}\int_{-\pi}^{\pi}\log[W(e^{j\omega})]e^{j\omega\tau}d\omega$$

This means that in the cepstral domain the complex cepstrum of the record of pressure oscillations in the well $\hat{x}(\tau)$ is the sum of the complex cepstrum: of the original signal of the source $\hat{s}(\tau)$ and the complex cepstrum of the wellbore reflectivity $\hat{w}(\tau)$:

$$\hat{x}(\tau)=\hat{s}(\tau)+\hat{w}(\tau) \quad (5)$$

Below is the analysis of the equation (5) as shown by the example of the most common signal sources in the well: single pulse (water hammers) and periodic (caused by oscillations of pump strokes).

According to (Tribolet & Oppenheim, 1977), if the function w(t) is a minimum-phase decaying train of pulses at time moments $\tau_1, \tau_2, \ldots \tau_M$, then its complex cepstrum $\hat{w}(\tau)$ is equal to zero when the quefrency values are $0<\tau<\tau_2-\tau_1$. Moreover, the complex cepstrum $\hat{w}(\tau)$ is equal to zero everywhere, except for $\tau_2-\tau_1, \tau_3-\tau_1, \ldots \tau_M-\tau_1$ and their positive linear combinations. According to (Stoffa, Buhl, & Bryan, 1974), the values of the complex cepstrum $\hat{w}(\tau)$ in these points will be of the same sign as the amplitudes of respective pulses of the function w(t). In particular, for example, the reflection from a fracture (the hydraulic impedance is lower than that of the wellbore) will manifest itself as a negative pulse in the complex cepstrum $\hat{w}(\tau)$. For example, the reflection from the bottom hole, the hydraulic impedance of which is higher than that of the well, will manifest itself as a positive pulse in the complex cepstrum $\hat{w}(\tau)$.

If the source signal s(t) is caused by a water hammer or an actuation of a perforation gun, it will have the form of a pulse and a smooth spectrum $S(e^{j\omega})$. Then, according to (Tribolet & Oppenheim, 1977), the non-zero values of the complex cepstrum of the source signal $\hat{s}(\tau)$ are localized in the region of small quefrency values, i.e., the complex cepstrum $\hat{s}(\tau) \neq 0$ with quefrency values not exceeding a certain threshold $\tau<T_s$.

Figure 3:
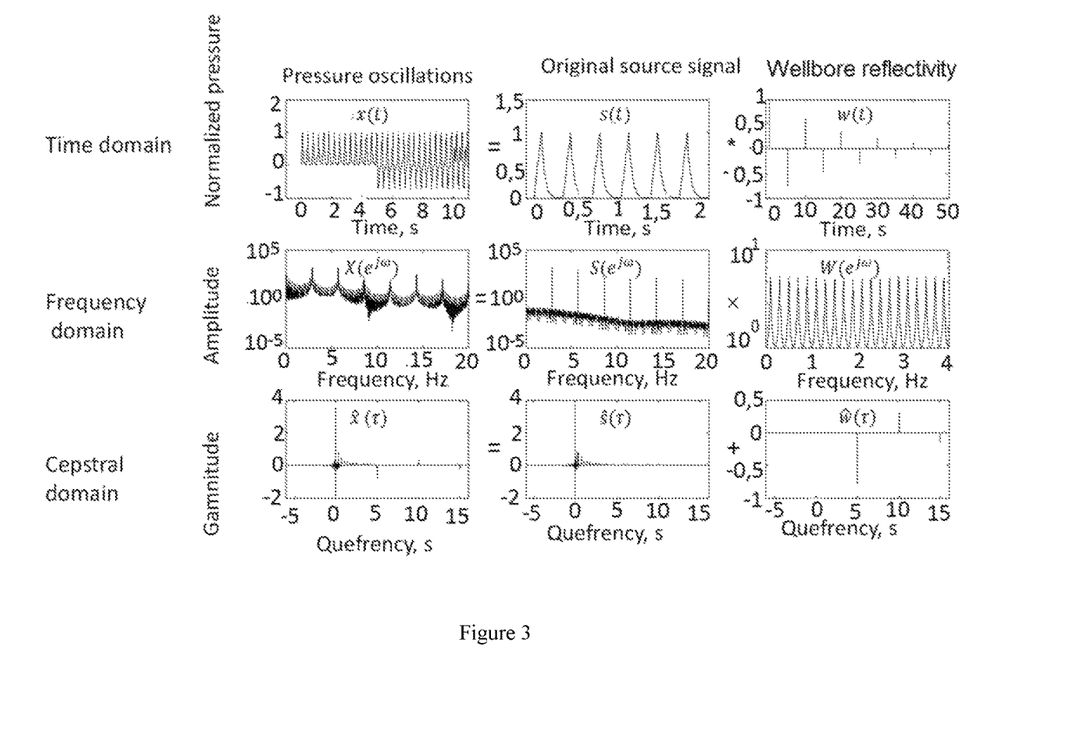
FIG. 3 shows an example of a representation of a convolutional equation for a periodic source with a periodic spectrum and the wellbore reflectivity with one fracture in the time, frequency and cepstral domains.

An exemplary representation of the convolutional equation for a single pulse source with a smooth spectrum and the wellbore reflectivity with one fracture in the time, frequency and cepstral domains is given in FIG. 3. The coefficient of reflection of tube waves from the fracture is negative, which leads to the alternating train of pulses for the wellbore reflectivity w(t). In accordance with the above features, the position of the first pulse of the complex cepstrum of the wellbore reflectivity $\hat{w}(\tau)$ corresponds to its period in the time domain, and its sign corresponds to the sign of the coefficient of reflection from the fracture. Thus, when the velocity of tube waves is known, the depth and type of the reflector $\hat{w}(\tau)$ can be derived from the complex cepstrum of the wellbore reflectivity. The complex cepstrum of the wellbore reflectivity $\hat{w}(\tau)$ is obtained by zeroing the record of pressure oscillations in the cepstral domain: $\hat{x}(\tau)=0$, for $|\tau|<T_s$.

If the source signal s(t) is caused by oscillations of hydraulic pump strokes on the surface, it can be represented in a simplified form as an infinite sum of signals caused by a single stroke pulse $s_0(t)$, which are spaced apart by the period between the strokes $T_p$. Mathematically, it can be represented in the form of convolution of the signal a single stroke pulse $s_0(t)$ with an infinite sequence of equispaced single pulses:

$$s(t) = s_0(t) * \Sigma_{k=0}^{\infty} \delta(t - kT_p) \quad (6)$$

Using the fact that convolution in the time domain becomes a sum in the cepstral domain, as well as using the expression for the complex cepstrum of an infinite sequence of equispaced pulses (Stoffa, Buhl, & Bryan, 1974), we can obtain the expression for the complex cepstrum of a periodic source:

$$\hat{s}(\tau) = \hat{s}_0(\tau) + \sum_{k=1}^{\infty} \frac{\delta(\tau - kT_p)}{k} \quad (7)$$

The complex cepstrum of a periodic source $\hat{s}(\tau)$ is the sum of the complex cepstrum of the signal of a single stroke pulse $\hat{s}_0(\tau)$, which is also localized in the region of small quefrency values and decaying sequence of pulses, which are also spaced apart by the stroke pulse time $T_p$.

An exemplary representation of the convolutional model for a periodic pulse and the wellbore reflectivity with one fracture is given in FIG. 3 in the form of time, frequency and cepstrum diagrams. The complex cepstrum of the wellbore reflectivity $\hat{w}(\tau)$ can be separated both from the complex cepstrum of the single stroke $s_0(\tau)$ localized in the region of small quefrency values, and the decaying sequence of pulses form the second term of the complex cepstrum of the source $\hat{s}(\tau)$, which has a regular pattern. Similarly to the above example with a pulse source, when the velocity of tube waves in the well is known from the complex cepstrum of the wellbore reflectivity $\hat{w}(\tau)$, the depth and type of the object that reflects the hydraulic signal can be determined. In particular, the positive sign of the intense signal corresponds to the type of a hydraulic signal-reflecting object with a higher hydraulic impedance than that of the wellbore, said object being at least one object selected from the group comprising: the bottom of the well, an isolation device for a cased well, the location where the casing diameter is reduced, and proppant accumulation in the wellbore. At the same time, the negative sign of the intense signal corresponds to the type of a hydraulic signal-reflecting object with a lower hydraulic impedance than that of the wellbore, said object being at least one object selected from the group comprising: a hydraulic fracture in a cased well, a hydraulic fracture in an uncased well, the location where the casing pipe diameter is increased, and a casing defect.

These theoretical examples show that the reflected signals are easily distinguishable in the cepstral domain and allow for the determination of both the depth and the type of a hydraulic signal-reflecting object. In reality, signals have a more complex form than in the above examples and may be burdened with noise. To distinguish the reflected signals in the actual data, it is more expedient to use a so-called real cepstrum instead of a complex cepstrum. Representing the Fourier transform of a signal $x(t)$ in the exponential form $X(e^{j\omega}) = |X(e^{j\omega})| e^{arg[X(e^{j\omega})]}$ and substituting it in the expression for the complex cepstrum (2), we can obtain its representation as a sum of two components:

$$\hat{x}(\tau) = \frac{1}{2\pi} \int_{-\pi}^{\pi} \log[X(e^{j\omega})] e^{j\omega\tau} d\omega = \quad (8)$$

-continued
$$\frac{1}{2\pi} \int_{-\pi}^{\pi} \log \left| X(e^{j\omega}) \right| e^{j\omega\tau} d\omega + \frac{1}{2\pi} \int_{-\pi}^{\pi} \arg[X(e^{j\omega})] e^{j\omega\tau} d\omega$$

The first term in the expression (8) is an inverse Fourier transform of the amplitude component of the spectrum and is called a real cepstrum, while the second term is called a phase cepstrum. Unlike the complex cepstrum, it is the real cepstrum, which does not contain information about the signal phase, that is the most sensitive to reflections in the signal. A power cepstrum obtained from the real cepstrum by squaring will be also sensitive to reflections in the signal.

In accordance with the present disclosure, a cepstrogram of the pressure signal is constructed, which is a visual representation of the cepstrum that changes in time. As appropriate, the trend (zero frequency) component is removed from the original signal before constructing a cepstrogram. To construct a cepstrogram, the pressure signal is divided into parts which typically overlap. A cepstrum is then calculated for each of these parts in the quefrency range, which corresponds to the expected wellbore reflectivity: $\tau_2 - \tau_1 \leq \tau \leq \tau_M - \tau_1$. Each part corresponds to a vertical line on the image: the gamnitude value of the cepstrum depending on the quefrency at any given time. Time is plotted on the horizontal axis of the cepstrogram.

As appropriate, filtration may be applied to the cepstrogram using a moving average along the time axis to increase the signal/noise ratio.

According to the above features of the complex cepstrum for the wellbore reflectivity $\hat{w}(\tau)$, the pressure oscillations caused by the reflections of tube waves from objects with a hydraulic impedance lower than in the well, such as hydraulic fractures, manifest themselves as negative gamnitude values on the cepstrogram at the respective quefrency values.

Similarly, the pressure oscillations caused by the signal reflected from objects with a hydraulic impedance higher than in the well (bottom hole) manifest themselves as positive gamnitude values on the cepstrogram at the respective quefrency values.

In accordance with the present disclosure, pressure oscillations are detected when the absolute value of the gamnitude of positive or negative peaks on the cepstrogram exceeds the threshold value set by the user.

The contours of travel times of waves $\tau_k(t)$ reflected from a reflecting boundary in the well are determined by tracing the maximum values of positive peaks and minimum values of negative peaks on the cepstrogram that exceed the threshold values set by the user. The positions of the contours in time determine the time intervals of pressure oscillations in the well. If the travel velocity of tube waves (hydraulic signal) in the wellbore $\alpha$ is known in advance, the depth $L(t)_k$ of the reflector in the well is determined as:

$$L(t)_k = \frac{\tau_k(t) a}{2} \quad (9)$$

Generally, the tube wave velocity in the well may be either estimated based on the properties of the fluid in the well, such as: density and bulk modulus of elasticity, and of the well completion elements, such as the Young's modulus of the casing and the shear modulus of the surrounding rock (Holzhausen & Gooch, 1985), U.S. Pat. No. 5,081,613, or determined by wave travel time calibration for clean pressure pulses reflected from objects (these may be well completion elements) with a known depth.

In particular, the following expression may be used to determine the tube wave velocity:

$$a = \sqrt{\frac{1}{\frac{\omega}{g}\left(\frac{1}{K} + \frac{dc}{Ee}\right)}}$$

where: E is the Young's modulus of the casing, K is the bulk modulus of elasticity of the fluid, ω is the density of the fluid, d is the inner diameter of the casing, e is the casing wall thickness, c=Ee/(Gd+Ee), where G is the shear modulus of the surrounding rock.

EXEMPLARY EMBODIMENTS

Example 1

Figure 6:
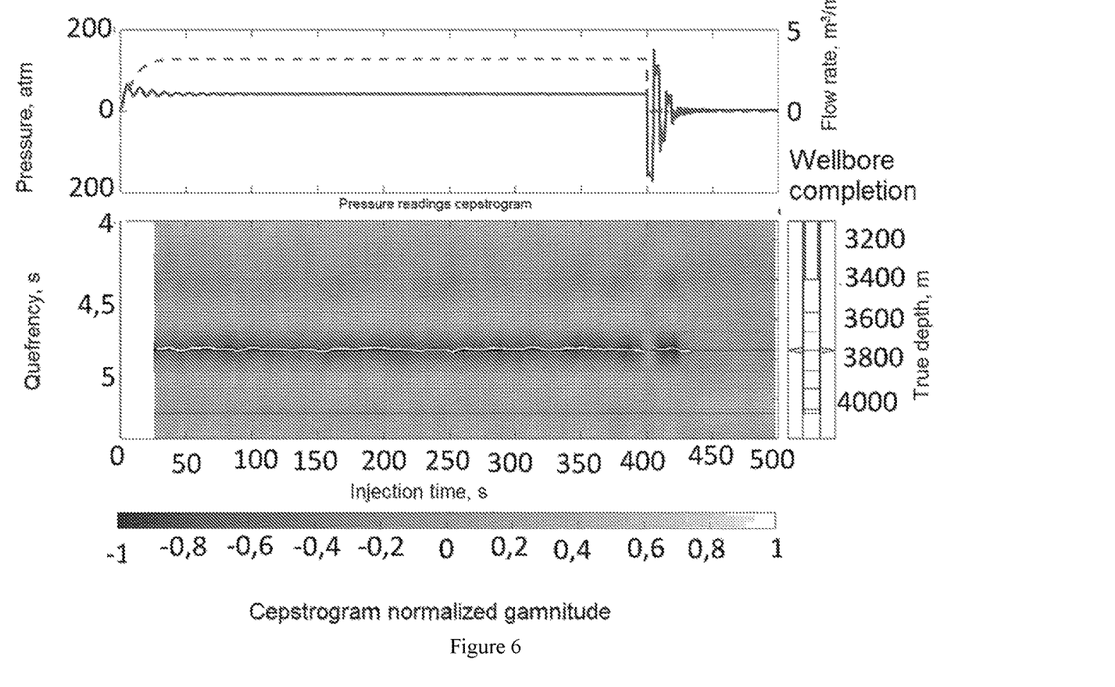
FIG. 6 shows a simulated example of the monitoring of the position of an open fracture located at the depth of 3,756 m during the injection of a fluid (proppant suspension) into the well with a flow rate of 3.2 $m^3$/min.

FIG. 6 shows a simulated example of the monitoring of the position of an open fracture located at the specified depth of 3,756 m during the injection of a fluid (proppant suspension) into the well at a flow rate of 3.2 m³/min., with the pumps being subsequently stopped. This example was produced using software for simulating tube waves in the well. In this example the propagation velocity of a hydraulic signal along the wellbore was 1,350 m/s.

The upper plot shows the records of the primary (unprocessed) pressure signal (measured in atm) and the fluid flow as a function of time (s). The pressure signal contains a signal caused by the pump stroke oscillations of the operating hydraulic pumps (the signal level is not shown) in the time interval of 0 to 400 s, and the pressure oscillations caused by a water hammer when the pumps were stopped in the time interval of 400 to 500 s.

The lower image shows the cepstrogram constructed for the synthetic pressure signal from the upper plot. The time scale of the cepstrogram plotted on the horizontal axis corresponds to the scale of the primary pressure signal. And the scale of depths of the reflected signal (constructed on the vertical axis to the right taking into account of the signal propagation velocity) corresponds to the parameter of quefrency plotted on the vertical axis to the left. The white line on the cepstrogram represents the contour of the signal travel times, which corresponds to the intense negative signal on the cepstrogram. As can be seen, the position of the contours of the travel times of the signals caused by different types of hydraulic signal sources (pump stroke oscillations or a water hammer due to the stop of the pump) is equal to the (specified) depth of the fracture indicated on the well diagram (to the right).

Example 2

Figure 7:
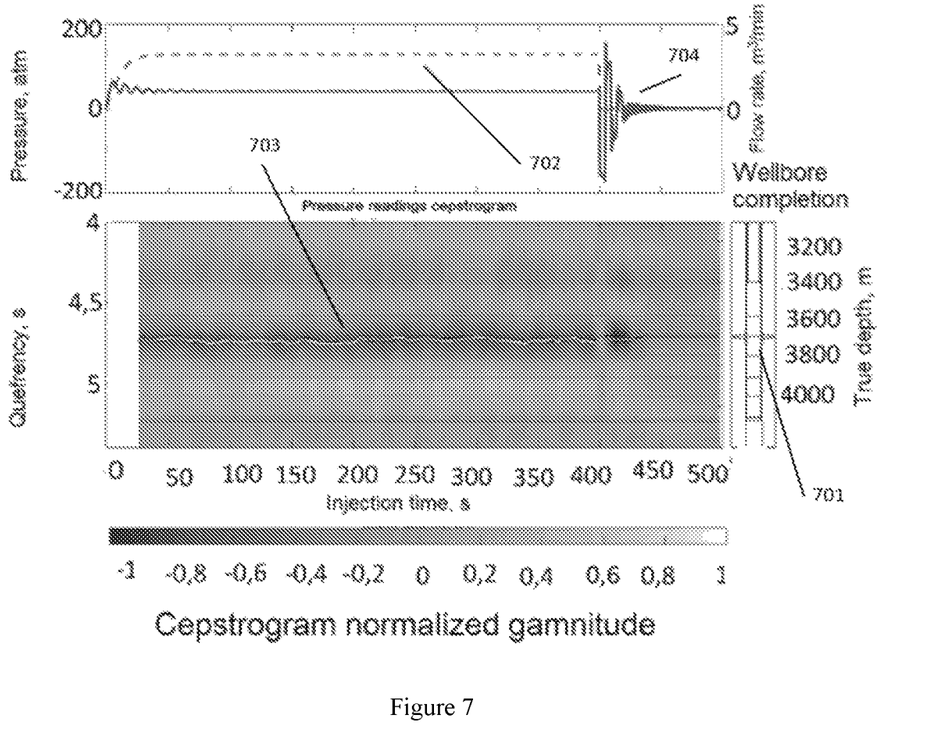
FIG. 7 shows a simulated example of the monitoring of the position of an open fracture located at the depth of 3,662 m during the injection of a fluid (proppant suspension) into the well with a flow rate of 3.2 $m^3$/min.

FIG. 7 shows a simulated example of the monitoring of the position of an open fracture 701 located at the specified depth of 3,662 m during the injection of a fluid (proppant suspension) into the well at a flow rate 702 of 3.2 m³/min., with the pumps being subsequently stopped. The negative values of the gamnitudes of the cepstrograms 703 in time correspond to the pressure oscillations caused by proppant injection and a water hammer 704 following the stop of the pumps. The comparison of the two cepstrograms confirms the actuation of the diverter (one of the ports in the wellbore completion is isolated). As can be seen, when the fracture depth is changed, the contour of the signal travel times, which corresponds to the intense signal on the cepstrogram, also corresponds to the new fracture depth.

As can be seen from examples 1 and 2, both the pump stroke oscillations and the water hammer may serve as an informative signal source for recording a pressure curve (and obtaining an informative cepstrogram).

In the examples provided above, the concept of a hydraulic signal source means that the source is placed either inside the well or at the wellhead in direct contact with the wellbore, i.e., in any configuration that ensures the propagation of a hydraulic pulse from the pressure source into the fluid-filled wellbore. Therefore, the surface pumps (connected to the manifold at the wellhead) are a source of hydraulic signals in the present disclosure.

Example 3

Figure 4:
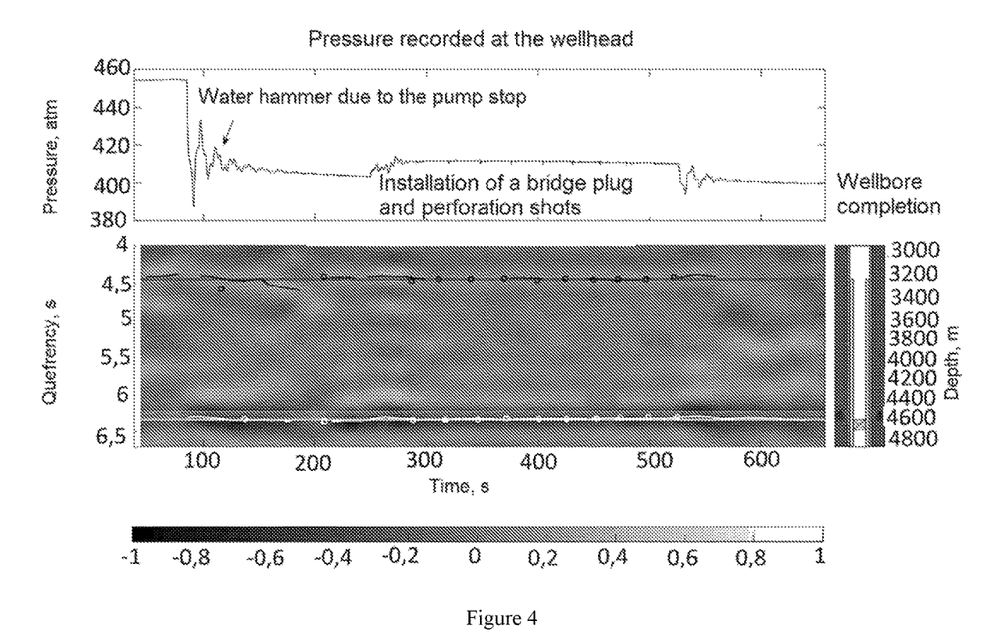
FIG. 4 shows an example of a cepstral analysis of pressure recorded at the wellhead during the installation of a bridge plug for hydraulic fracturing and the perforation of a new interval.

FIG. 4 shows an example of actual work on the well with a hydraulic signal being processed. A cepstral analysis of pressure recorded at the wellhead during the installation of a bridge plug for hydraulic fracturing and the perforation of a new interval is shown. The clean positive peaks in the upper section and the negative peaks in the lower section are marked with dark and light lines, respectively. The small circles indicate the depths of reflections measured "manually". The dark horizontal line indicates the depth where the internal pipe diameter in the well is reduced, and the white lines correspond to the depths of perforations.

The pressure record contains a water hammer caused by the stop of the pumps after pumping down the perforation guns in the horizontal section of the well with subsequent pressure oscillations (caused by the installation of a bridge plug and actuations of perforation guns). The cepstrogram contains clean positive peaks in the upper section and negative peaks in the lower section. The oscillation periods measured manually for reflections of the same sign (indicated with dark circles) coincide with the positive peaks, and the oscillation periods measured manually for reflections of the opposite sign (light symbols) coincide with the negative peaks on the cepstrogram. The comparison of the depths of the positive peaks with the depth of location where the inner pipe diameter in the well is changed makes it possible to determine the propagation velocity of tube waves in pad fluid c=1461.5 m/s. The negative peaks allow tracking the moments of perforation gun movements from bottom to top as the formation interval is being perforated.

Example 4

Another example of recording the actual work and signal processing illustrates the use of cepstral analysis to confirm the actuation of the flow diverter in the well for repeated hydraulic fracturing, in which a previously stimulated operating well is stimulated again to increase the production rate. The flow diverter in the form of suspension of colmatation particles is injected into the well to isolate the selected fluid leakage zones.

Figure 5A:
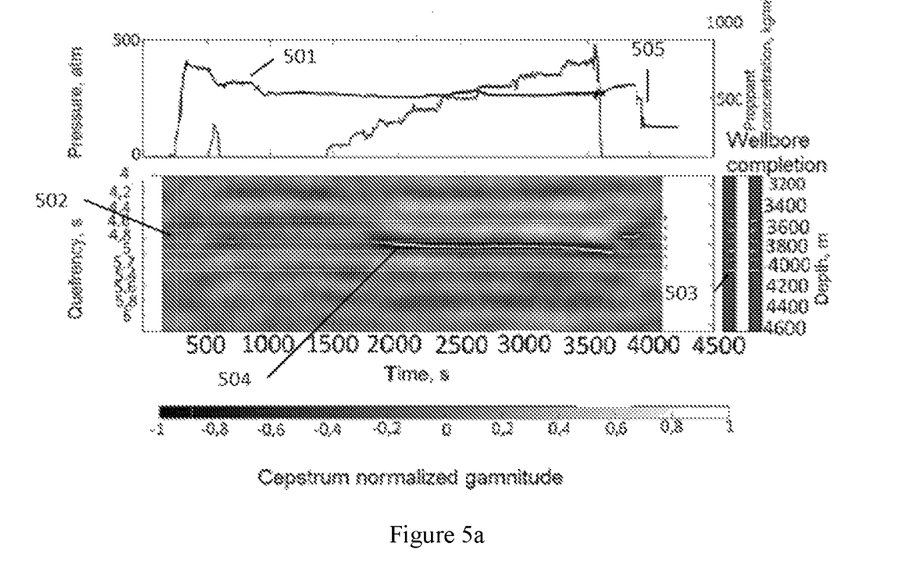
FIG. 5 shows an example of a cepstral analysis of pressure recorded at the wellhead, recorded for two successive stages of repeated hydraulic fracturing.
Figure 5B:
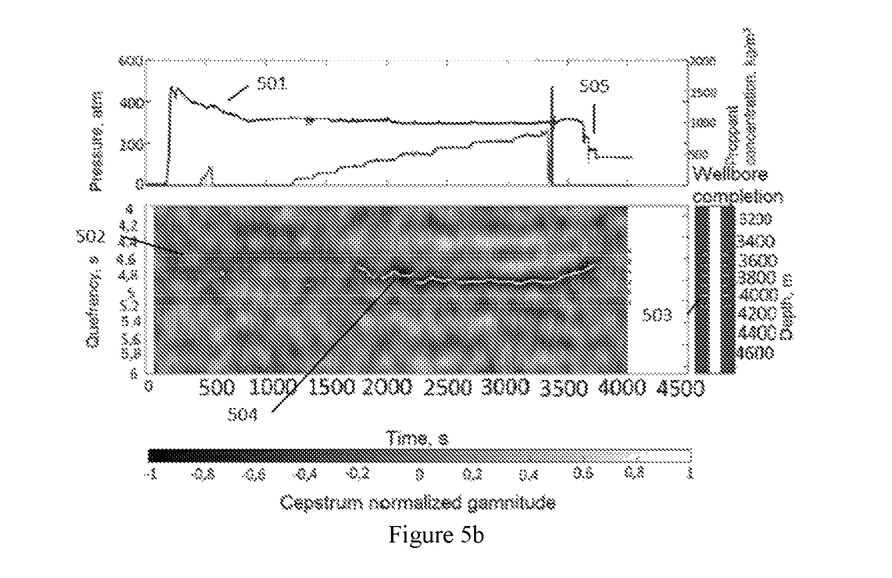

An exemplary cepstral analysis of pressure 501 recorded at the wellhead, performed for two successive stages of repeated hydraulic fracturing is shown in FIG. 5a (for the first stage) and FIG. 5b (for the second stage). The white horizontal lines 502 show the location depths of the hydraulic fracturing ports 503. The negative values of the gamnitudes of the cepstrograms 504 in time correspond to the pressure oscillations caused by proppant injection and a water hammer 505 following the stop of the pumps. The comparison of the two cepstrograms confirms the actuation of the diverter (one of the ports in the wellbore completion is isolated).

The velocity of tube waves in the pad fluid determined by calibration was c=1554.5 m/s. The calibration was performed by measuring the travel time of a single pulse excited in a "quiet" (without noise) well and reflected from the bottom hole.

The comparison of the negative values of the gamnitudes of the cepstrograms, which correspond to water hammers (due to by stops of the pumps) confirms the fluid redirection and the stimulation of a new interval: after the injection of the first stage, the tube wave reflection point was located at hydraulic fracturing port #4, and after the injection of second stage the signal reflection point moved upward to hydraulic fracturing port #5. In addition, both of the cepstrograms show reflection from a fracture caused by the pump stroke oscillations during proppant injection. As can also be seen on the cepstrogram, the apparent depth of reflection from the object grows as the concentration of proppant in the fracturing fluid is increased. The latter is related to the reduced propagation velocity of tube waves, which depends, in particular, on the density of the fluid (proppant suspension) in the well.

The results of the analysis of pressure oscillations in the well can be used in hydraulic fracturing both for optimizing the stimulation in real-time mode and for assessing the stimulation efficiency in post job analysis for: assessing the actuation of the fracturing fluid flow diverter (diversion plug for isolating holes in the pipe); assessing the fracture geometry; identifying the emergency stop of hydraulic fracturing due to proppant settling in the wellbore (screen out); monitoring the operations performed using coil tubing or well surveying instruments; leakage diagnostics in the casing; undesirable hydraulic fracturing diagnostics; as well as for confirming the degradation of bridge plugs made of degradable materials in the well.

A low-cost method is provided for the monitoring of well operations, both in real time and by in post job data analysis, based on the cepstral analysis of well pressure data recorded at the wellhead. The claimed method is based on the construction of a cepstrogram of a pressure signal, which is a visual representation of the cepstrum that changes in time.

Within the framework of cepstral analysis, pressure oscillations in a well are easily distinguishable and traceable on the cepstrogram with subsequent determination of their periods and polarities. These parameters are used to detect downhole reflectors (objects), to determine the depths of downhole reflectors during well operations and their features using the sign of an intense signal on the cepstrogram.

A wide variety of devices and processes can be the source of a hydraulic signal being reflected from well completion components: a water hammer due to the stop of the pump, noise of the operating pumps (periodic pressure oscillations caused by pump piston movements), pressure pulses from downhole pulse generators.

This enables signal recording and processing without additional equipment, and allows the use of signal sources that were not used previously to determine the location of a hydraulic signal-reflecting object; for example, signals generated by pulsed sources (water hammers) can be used, but also the present disclosure enables the processing of signals generated by periodic sources (pump noises), which cannot be processed manually. In addition, using noises of pumps (both surface and subsurface) as signals will allow the continuous monitoring of the well, which cannot be implemented using pulsed signal sources.

The present disclosure enables the detection and processing of pressure oscillation events, which reduces the time of processing and increases the accuracy in comparison with manual processing of events.

The present disclosure can be implemented using a standard pressure sensor placed at the wellhead, a data collection device, and a computer-based system for data processing and visualization with data processing by cepstral algorithm.

Persons skilled in the art will recognize that the present disclosure can be implemented in various configurations of computer systems including portable devices, multiprocessor systems, microprocessor-based or programmable consumer electronic equipment, minicomputers, mainframes and the like. Any number of networks of computer systems and computers is acceptable for use with the present disclosure. The present disclosure can be implemented in a distributed computing environment, wherein the tasks are performed by remote processing facilities interconnected via a communications network. In a distributed computing environment, software modules may be located both in local and remote storage media. Therefore, the present disclosure can be implemented in conjunction with various hardware and software tools or their combination in a computer system or another processing system.

The implementation system of the present disclosure can be implemented on a computer. The system includes a computing unit, sometimes referred to as a computing system, which comprises a memory device, application software, client interface, video interface and a processing unit. The computing unit is mentioned as an example of a suitable computing environment and does not limit the scope of application or functionality of the present disclosure.

The memory device stores application programs, which can also be described as software modules containing computer-executable instructions executed by the computing unit to implement the present disclosure described herein.

The present disclosure can be implemented in a computer-executable program of instructions, such as software modules referred to as software applications or application programs executed by a computer. The software may include, for example, standard functions, programs, objects, data components and structures, which perform specific tasks or implement particular abstract data types. The software forms an interface, which allows the computer to response in accordance with the input source. The software can also cooperate with other code segments to initiate various tasks in response to the data received along with the source of the data received. The software may be stored and/or transferred on any memory device such as CD-ROM, magnetic disk, bubble memory, and semiconductor memory (e.g., various type of RAM or ROM). Furthermore, the software and its results can be transmitted by any of a variety of media such as optical fibers, metal wires, and/or by any of a variety of networks, such as the Internet.

The computing unit has a generalized memory device and typically includes various computer-readable media. As a non-limiting example, the machine-readable medium may contain a storage medium. The computing system memory device may include a storage medium in the form of a volatile and/or non-volatile storage, such a read-only memory (ROM) or random-access memory (RAM). The basic input/output system (BIOS) containing standard routines which help to transfer information between elements within the computing unit, for example during the start-up, is generally stored in the ROM. The RAM generally contains data and/or software modules which are available on-line and/or currently executed on the processing unit. As a non-limiting example, the computing unit includes an operating system, application program, other software modules and software data.

The components shown in the memory device may also be included in other removable/non-removable, volatile/non-volatile storage media, or they may be implemented in the computing unit by means of an application programming interface (API), which may be located in a separate computing unit connected via a computer system or network. For example, a hard disk drive can read from or write to a non-removable non-volatile magnetic medium; a magnetic disk drive can read from or write to a removable non-volatile magnetic disk; and an optical disk drive can read from or write to on a removable non-volatile optical disk, such as a CD ROM or other optical media. Other removable/non-removable, volatile/non-volatile storage media, which can be used in a typical operating environment, may include but are not limited to magnetic tape cassettes, flash memory cards, digital versatile discs (DVD), digital magnetic tapes, semiconductor RAM, semiconductor ROM and the like. Drives and their associated storage media described above ensure the storage of computer-executable instructions, data structures, software modules and other data for the computing unit.

The client can input commands and information into the computing unit via a client interface, which may be an input device, such as a keyboard or a pointing device commonly referred to as a mouse, trackball or touch pad. Input devices may include a microphone, joystick, satellite dish, scanner and the like. These and other input devices are often connected to the processing unit through a system bus, but may also be connected by other interface and bus structures, such as a parallel port or a universal serial bus (USB).

A monitor or other type of display device may be connected to the system bus via an interface, such as a video interface. A graphical user interface (GUI) may also be used with a video interface to receive instructions from the client interface and transfer instructions to the processing unit. In addition to the monitor, computers may also include other peripheral output devices such as speakers and a printer, which may be connected through an output peripheral interface.

Although many other components of the computing unit are not shown, persons skilled in the art will appreciate that such components and their interconnection are well known.

It is apparent that the above embodiments shall not be regarded as a limitation of the patent claims scope. It is clear for a person skilled in the art that it is possible to introduce many changes to the technique described above without departing from the principles of the claimed disclosure.

The invention claimed is:

1. A method for detecting a hydraulic signal-reflecting object in a well, wherein: (a) a fluid-filled wellbore is provided, said fluid enabling the propagation of a hydraulic signal; (b) at least one hydraulic signal source is provided, said source being in fluid communication with the wellbore and designed to generate a hydraulic signal; (c) at least one pressure sensor is provided, said pressure sensor being designed to register a hydraulic signal and being in fluid communication with the wellbore and at least one hydraulic signal source; (d) the hydraulic signal is registered with at least one pressure sensor during well operations; (e) a pressure cepstrogram is formed, and an intensive signal is then found in the pressure cepstrogram; and (f) at least one object reflecting the hydraulic signal is detected in the wellbore based on the peaks of the intensive signal found in the pressure cepstrogram.

2. The method of claim 1, wherein the hydraulic signal source is at least one event selected from the group comprising: a water hammer due to the stop or start of a surface pump, noise from a subsurface pump, noise from an operating surface pump, an event of perforation in a cased well, pressure pulse generation using a pulse source.

3. The method of claim 1, wherein the hydraulic signal is registered using at least one pressure sensor located at a wellhead or in the wellbore.

4. The method of claim 1, wherein a pressure cepstrogram is formed by processing the registered hydraulic signal in the quefrency vs. time coordinates.

5. The method of claim 2, wherein the registered hydraulic signal is processed by dividing the hydraulic signal into time intervals, for each of which a signal cepstrum is calculated, and which is displayed as a vertical line on the pressure cepstrogram.

6. The method of claim 1, wherein an intensive signal is found in the pressure cepstrogram using an absolute value of the hydraulic signal that exceeds a specified threshold value.

7. The method of claim 1, wherein the hydraulic signal propagation velocity in the fluid in the wellbore is additionally determined tentatively by measuring the travel time of the reflected signal from at least one specified object located at a known depth, or depending on the fluid properties, such as density, modulus of elasticity, as well as on the well properties, including Young's modulus, casing wall thickness, and on the properties of the surrounding rock, including shear modulus.

8. The method of claim 7, wherein the hydraulic signal propagation velocity in the fluid in the wellbore is used to determine the depth of at least one hydraulic signal-reflecting object in the well based on the peaks of the intensive signal values on the pressure cepstrogram, which specify the contours of the travel times of the reflected hydraulic signal.

9. The method of claim 1, wherein the positive sign of the intensive signal on the pressure cepstrogram corresponds to the hydraulic signal-reflecting object with a higher hydraulic impedance than that of the wellbore, said object being at least one object selected from the group comprising: the bottom of the well, an isolation device for a cased well, the location where the casing pipe diameter is reduced, and proppant accumulation in the wellbore.

10. The method of claim 1, wherein the negative sign of the intensive signal on the pressure cepstrogram corresponds to the hydraulic signal-reflecting object with a lower hydraulic impedance than that of the wellbore, said object being at least one object selected from the group comprising: a hydraulic fracture in a cased well, a hydraulic fracture in an uncased well, the location where the casing pipe diameter is increased, and a casing defect.

11. The method of claim 1, wherein the hydraulic signal is additionally preprocessed if the registered hydraulic signal has a trend component and/or a high-frequency noise by removing them.

12. The method of claim 11, wherein the trend component is removed by calculating the derivative of the hydraulic signal registered by the pressure sensor against time.

13. The method of claim 11, wherein the trend component is removed by its subtraction from values of the hydraulic signal registered by the pressure sensor.

14. The method of claim 11, wherein the presence of the trend component is determined by applying a low-pass filter to values of the hydraulic signal registered by the pressure sensor.

15. The method of claim 11, wherein the high-frequency noise is removed by applying a low-pass filter to values of the hydraulic signal registered by the pressure sensor.

16. A system for detecting a hydraulic signal-reflecting object in a well, comprising: (a) a wellbore filled with a fluid that enables the propagation of a hydraulic signal; (b) at least one hydraulic signal source that is in fluid communication with the wellbore and is designed to generate a hydraulic signal; (c) at least one pressure sensor that is designed to register a hydraulic signal and is in fluid communication with the wellbore and at least one hydraulic signal source; (d) a processing system configured to: receive and process the data obtained by at least one pressure sensor during well operations to register the hydraulic signal; form a pressure cepstrogram and detect an intensive signal on the pressure cepstrogram; detect at least one hydraulic signal-reflecting object in the wellbore based on the peaks of the intensive signal found in the pressure cepstrogram.

17. The system of claim 16, wherein the hydraulic signal source is at least one event selected from the group comprising: a water hammer due to the stop or start of a surface pump, noise from a subsurface pump, noise from an operating surface pump, an event of perforation in a cased well, pressure pulse generation using a pulse source.

18. The system of claim 16, wherein the pressure sensor is located at a wellhead or in the wellbore.

19. The system of claim 16, wherein the processing system is configured to form a pressure cepstrogram by processing the registered hydraulic signal in the quefrency vs. time coordinates.

20. The system of claim 19, wherein the processing system is configured to process the registered hydraulic signal by dividing the hydraulic signal into time intervals, for each of which a signal cepstrum is calculated, and which is displayed as a vertical line on the pressure cepstrogram.

21. The system of claim 16, wherein the processing system is configured to find an intensive signal on the pressure cepstrogram using an absolute value of a hydraulic signal that exceeds the specified threshold value.

22. The system of claim 16, wherein the processing system is further configured to tentatively determine the hydraulic signal propagation velocity in the fluid in the wellbore by processing the measured travel time of the reflected signal from at least one specified object located at a known depth, or depending on the fluid properties, such as density, modulus of elasticity, as well as on the well properties, such as Young's modulus, casing wall thickness, and on the properties of the surrounding rock, for example, shear modulus.

23. The system of claim 22, wherein the processing system is additionally configured to use the hydraulic signal propagation velocity in the fluid in the wellbore when forming a pressure cepstrogram in the quefrency vs. time coordinates.

24. The system of claim 22, wherein the processing system is additionally configured to use the hydraulic signal propagation velocity in the fluid in the wellbore for determining the depth of at least one hydraulic signal-reflecting object in the well based on the peaks of the intensive signal on the pressure cepstrogram, which specify the contours of the travel times of the reflected hydraulic signal.

25. The system of claim 22, wherein the processing system is additionally configured to identify at least one object that reflects the hydraulic signal, and differs by the sign of the intensive signal.

26. The system of claim 25, wherein the positive sign of the intensive signal corresponds to the hydraulic signal-reflecting object with a higher hydraulic impedance than that of the wellbore, said object being at least one object selected from the group comprising: the bottom of the well, an isolation device for a cased well, the location where the casing pipe diameter is reduced, and proppant accumulation in the wellbore.

27. The system of claim 25, wherein the negative sign of the intensive signal corresponds to the hydraulic signal-reflecting object with a lower hydraulic impedance than that of the wellbore, said object being at least one object selected from the group comprising: a hydraulic fracture in a cased well, a hydraulic fracture in an uncased well, the location where the casing pipe diameter is increased, and a casing defect.

28. The system of claim 16, wherein the processing system is additionally configured to preprocess the hydraulic signal if the registered hydraulic signal has a trend component and/or a high-frequency noise by removing them.

* * * * *